United States Patent
Lo et al.

(10) Patent No.: US 7,813,030 B2
(45) Date of Patent: Oct. 12, 2010

(54) DISPLAY AND FABRICATING METHOD THEREOF

(75) Inventors: Kuo-Lung Lo, Taipei County (TW); Wei-Yuan Cheng, Taipei County (TW); Jyh-Wen Shiu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 141 days.

(21) Appl. No.: 12/197,910

(22) Filed: Aug. 25, 2008

(65) Prior Publication Data

US 2009/0169806 A1 Jul. 2, 2009

(30) Foreign Application Priority Data

Dec. 28, 2007 (TW) ............................... 96150767 A

(51) Int. Cl.
*G02B 26/00* (2006.01)
*G02B 26/02* (2006.01)
*G09G 3/36* (2006.01)

(52) U.S. Cl. .................. 359/295; 359/291; 359/296; 359/228; 359/253; 345/60; 345/87

(58) Field of Classification Search .............. 359/290, 359/291, 295, 298, 245, 270, 296; 349/24, 349/96, 138, 141, 167, 170, 171; 252/299.01, 252/500; 345/60, 87; 156/242, 277, 292; 428/1.1, 119; 430/32
See application file for complete search history.

(56) References Cited

U.S. PATENT DOCUMENTS

| | | | |
|---|---|---|---|
| 6,525,866 B1 * | 2/2003 | Lin et al. ................. | 359/296 |
| 6,633,348 B2 * | 10/2003 | Shohara et al. ........... | 349/1 |
| 7,349,147 B2 * | 3/2008 | Chopra et al. ............ | 359/296 |
| 7,359,108 B2 * | 4/2008 | Hayes et al. ............. | 359/296 |
| 7,426,074 B2 * | 9/2008 | Tam et al. ............... | 359/296 |
| 7,463,409 B2 * | 12/2008 | Daniel et al. ............ | 359/296 |
| 2005/0151709 A1 | 7/2005 | Jacobson et al. | |
| 2006/0132927 A1 | 6/2006 | Yoon | |
| 2008/0218444 A1 * | 9/2008 | Rosser ................... | 345/60 |
| 2008/0297880 A1 * | 12/2008 | Steckl et al. ............ | 359/291 |
| 2009/0034054 A1 * | 2/2009 | Ikegami et al. .......... | 359/296 |
| 2009/0046045 A1 * | 2/2009 | Ikegami ................. | 345/87 |

FOREIGN PATENT DOCUMENTS

WO  WO 2005/098524 A1  10/2005
WO  WO 2006/017129 A2  2/2006

* cited by examiner

*Primary Examiner*—Loha Ben

(57) ABSTRACT

A display and fabricating method thereof is provided. The display includes a first substrate, a second substrate, a hydrophobic layer, a nonpolar liquid layer, a hydrophilic separator, a polar liquid layer, and a protruding spacer. The first and second substrates respectively include an opposing surface, and are disposed in a way that the opposing surfaces are face-to-face opposing to each other. The hydrophobic layer overlies the opposing surface of the second substrate. The nonpolar liquid layer overlies the hydrophobic layer. The hydrophilic separator overlies the hydrophobic layer and surrounds the nonpolar liquid layer. The polar liquid layer overlies the nonpolar liquid layer. The protruding spacer is disposed between the hydrophilic separator and the first substrate.

29 Claims, 16 Drawing Sheets

DISPLAY AND FABRICATING METHOD THEREOF

CROSS REFERENCE TO RELATED APPLICATIONS

This Application claims priority of Taiwan Patent Application No. 96150767, filed on Dec. 28, 2007, the entirety of which is incorporated by reference herein.

BACKGROUND OF THE INVENTION

1. Field of the Invention

The invention relates to display technology and more particularly to electrowetting displays and fabricating methods thereof.

2. Description of the Related Art

Generally, in a so-called electrowetting technology, electric voltage is applied to a polar liquid acting as an electrolyte, causing the surface tension of the polar liquid to change. Electrowetting technology is applied to displays. For example, hydrophobic insulators, electrodes, polar liquids, and nonpolar liquids are disposed and limited in a pixel region, and electric voltage is applied to the polar liquids, causing the interface tension between the polar liquids and hydrophobic insulators to change. Thus, causing the nonpolar liquids to move or agglomerate backward. The reflective light varies due to motion or agglomeration of the nonpolar liquids. Thus, allowing colors displayed by displays to be adjustable.

In the electrowetting displays disclosed by the subsequently listed patent publications 1 and 2, separators between each pixel do not completely support the gap between the upper and lower substrates for one single pixel range. When applying the technologies to flexible displays, at flexed portions, the problem of polar liquid overflow potentially occurs from one single pixel to a neighboring pixel.

In the electrowetting displays disclosed by the subsequently listed patent publication 3, closed structures are utilized for each pixel, but greater height (high-wide ratio) of the separators is required, resulting in increased processing difficulty. Further, the disposition processes of the nonpolar liquids is not compatible with cheaper and simpler dip-coating processes, potentially increasing process cost and decreasing process yield.

In the electrowetting displays disclosed by the subsequently listed patent publication 4, a device for holding the nonpolar liquids at a position where the nonpolar liquids agglomerate backward, is capable of improving the display quality of electrowetting displays. However, practical implementation of the process for devices is difficult, also potentially increasing process cost and decreasing process yield.

Above mentioned patent publications are as follows:
1. WO 2005/098524;
2. WO 2006/017129;
3. US 2006/0132927; and
4. US 2005/0151709.

BRIEF SUMMARY OF THE INVENTION

Embodiments of the invention provide displays and fabricating methods thereof that dispose protruding spacers between hydrophilic separators and substrates of the electrowetting displays to make the gap between two substrates in each single pixel range stable and also prevent overflow of polar liquids when flexing of flexible electrowetting displays.

An embodiment of the invention further provides a display comprising a first substrate, a second substrate, a hydrophobic layer, a nonpolar liquid layer, a hydrophilic separator, a polar liquid layer, and a protruding spacer. The first and second substrates respectively comprise an opposing surface, and are disposed in a way that the opposing surfaces are face-to-face opposing to each other. The hydrophobic layer overlies the opposing surface of the second substrate. The nonpolar liquid layer overlies the hydrophobic layer. The hydrophilic separator overlies the hydrophobic layer and surrounds the nonpolar liquid layer. The polar liquid layer overlies the nonpolar liquid layer. The protruding spacer is disposed between the hydrophilic separator and the first substrate.

An embodiment of the invention further provides a display comprising a first flexible substrate, a second flexible substrate, a hydrophobic layer, a hydrophilic separator, and a protruding spacer. The first flexible substrate and the second flexible substrate are disposed oppositely to each other. A polar liquid layer and a nonpolar liquid layer are disposed between the first flexible substrate and the second flexible substrate. The nonpolar liquid layer is disposed between the polar liquid layer and the second flexible substrate. The hydrophobic layer is disposed between the polar liquid layer and the second flexible substrate. The hydrophilic separator overlies the hydrophobic layer and surrounds the nonpolar liquid layer. The protruding spacer is disposed between the hydrophilic separator and the first flexible substrate.

An embodiment of the invention further provides a fabrication method of a display. First, a first substrate and a second substrate each comprising an opposing surface is provided. Then, a hydrophobic layer is formed overlying the opposing surface of the second substrate. Next, a hydrophilic separator is formed overlying the hydrophobic layer and surrounding a predetermined pixel region. Next, a protruding spacer is formed overlying the opposing surface of the first substrate, corresponding to a predetermined area of the hydrophilic separator. Next, a nonpolar liquid layer is disposed overlying the hydrophobic layer in the pixel region, wherein the nonpolar liquid layer is surrounded by the hydrophilic separator. Further, a polar liquid layer is disposed overlying the nonpolar liquid layer. Finally, the protruding spacer and the predetermined area of the hydrophilic separator are aligned, fixing the protruding spacer above the hydrophilic separator, and disposing the first substrate and the second substrate in a way that the opposing surfaces are face-to-face opposing to each other.

Further scope of the applicability of the invention will become apparent from the detailed description given hereinafter. It should be understood, however, that the detailed description and specific examples, while indicating preferred embodiments of the invention, are given by way of illustration only, as various changes and modifications within the spirit and scope of the invention will become apparent to those skilled in the Art from this detailed description.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
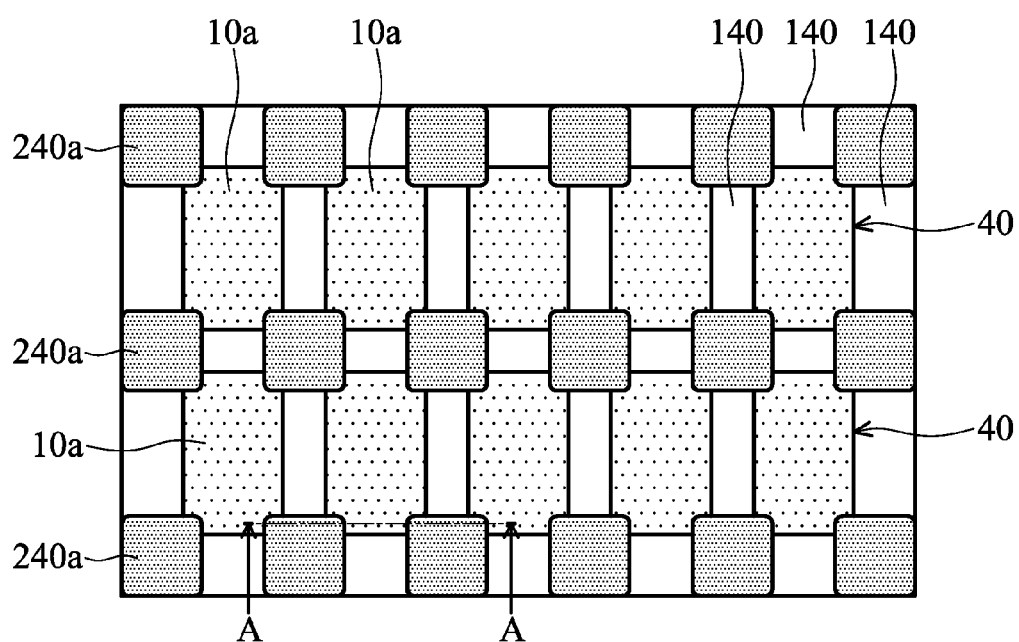
FIG. 1A shows a top view of a display of one or more preferred embodiments of the invention when no electric voltage is applied to liquid layers.
Figure 1B:
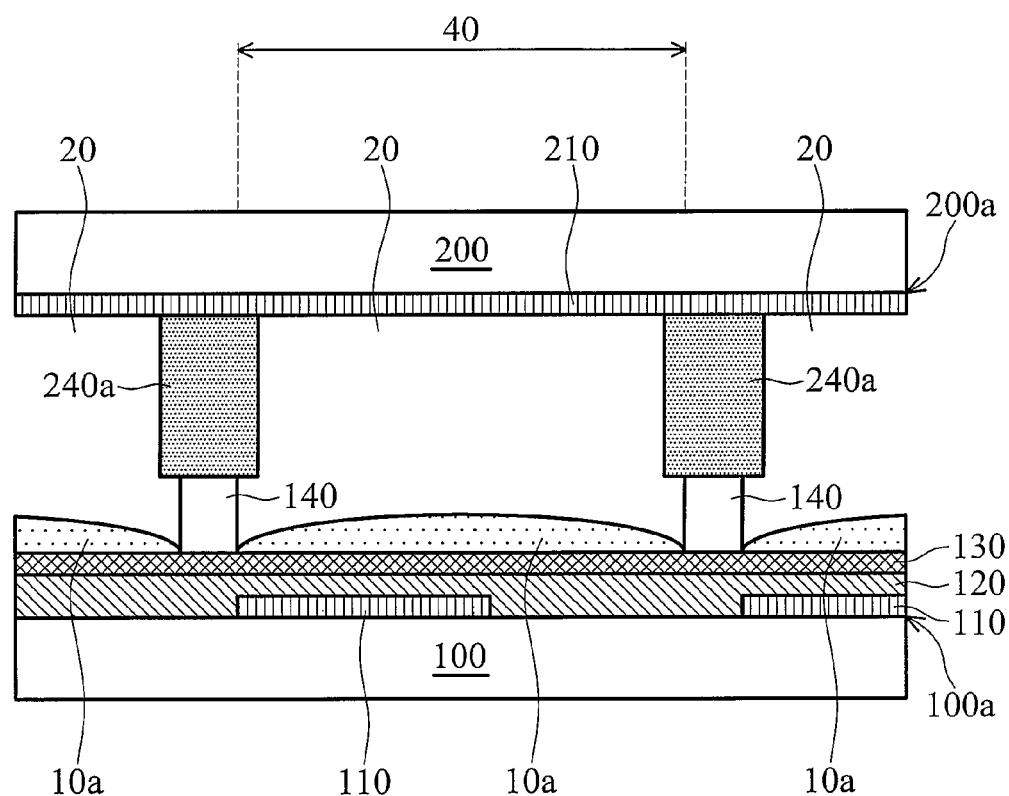
FIGS. 1B through 1D show exemplary cross-sections along line AA in FIG. 1A.
Figure 1C:
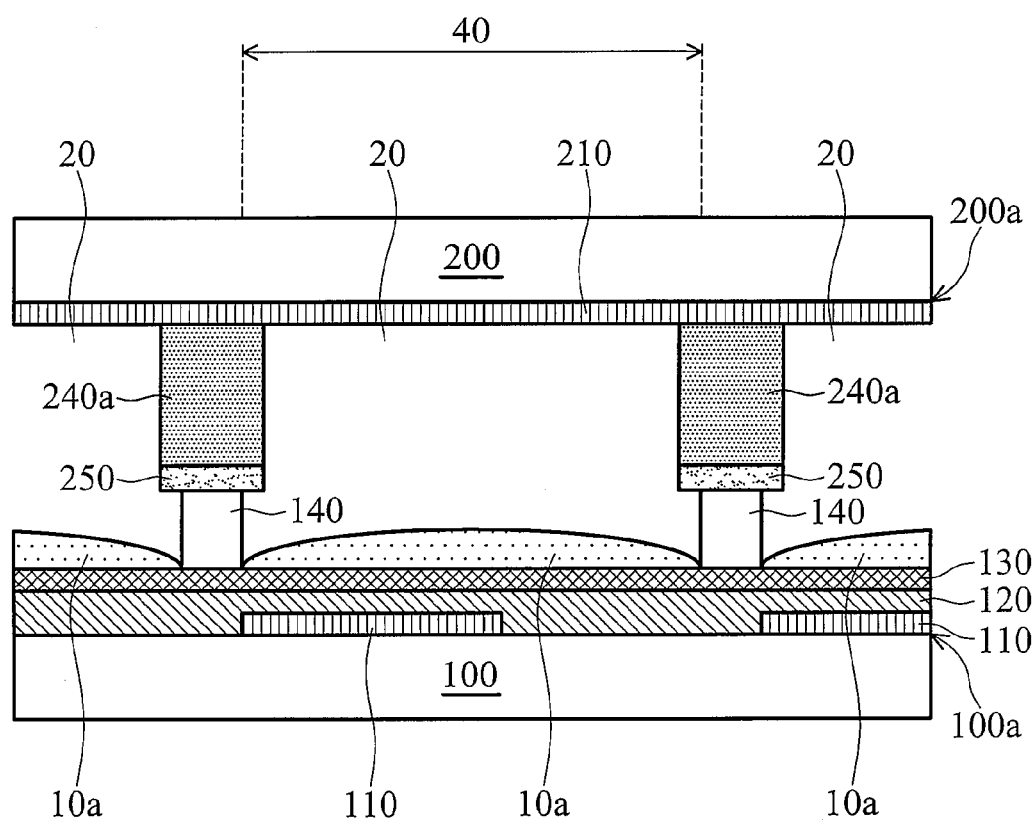
Figure 1D:
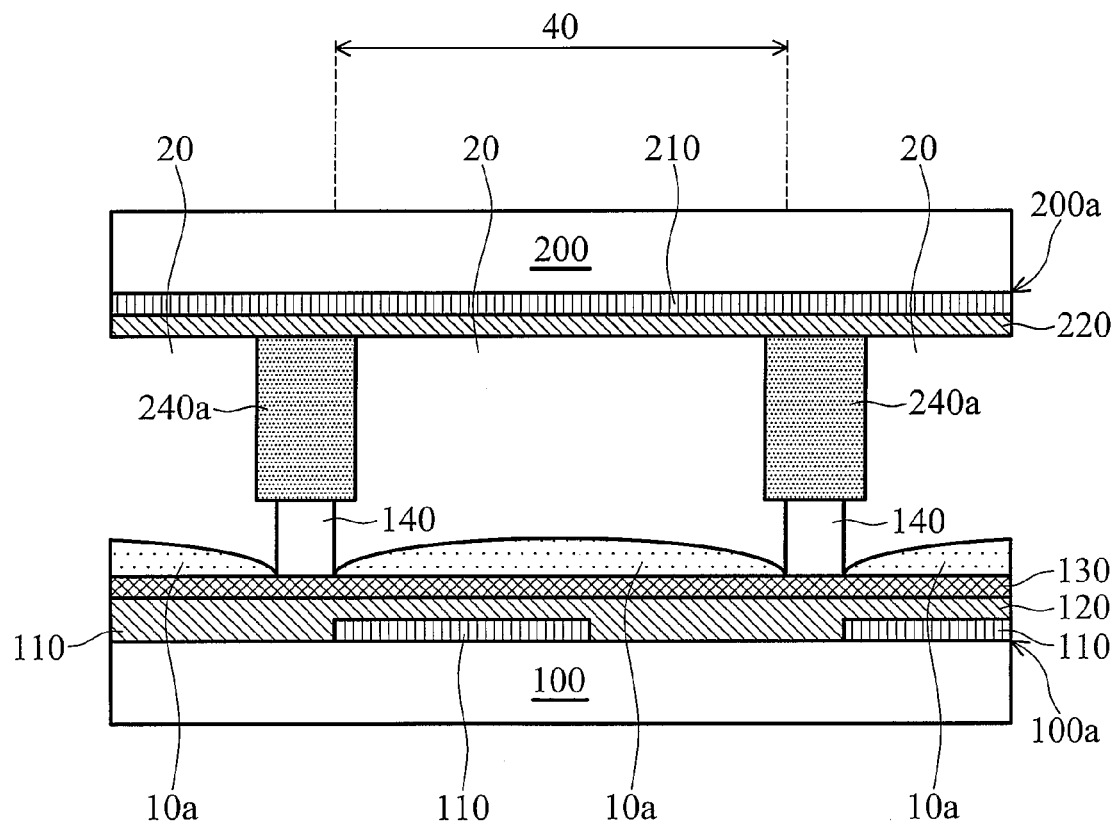

FIGS. 1A and 1B through 1D are respectively a top view and cross-sections of displays of a plurality of preferred embodiments of the invention when no electric voltage is applied to liquid layers. FIGS. 1B through 1D are cross-sections along line AA in FIG. 1A, and FIG. 1A shows relative top views from an outer side of the substrate 200 to the substrate 100. The substrate 200 and the electrode layer 210 thereon shown in FIGS. 1B through 1D, the adhesive layer 250 shown in FIG. 1C, and the dielectric layer 220 shown in FIG. 1D are not shown in FIG. 1A for clarity and simplicity.

In FIG. 1B, the substrates 100 and 200 respectively comprise opposing surfaces 100a and 200a, and are disposed in a way that the opposing surfaces 100a and 200a are face-to-face opposing to each other. The substrates 100 and 200 can be glass, polymers, or metals. In this embodiment, the substrates 100 and 200 are both transparent substrates. In other embodiments, one of the substrates 100 and 200 is a transparent substrate, and the other is a reflective substrate such as metals. In yet other embodiments, the substrates 100 and 200 are both flexible substrates, and can be polymers, or polymer substrates comprising reflective materials.

A polar liquid layer 20 and a nonpolar liquid layer 10a are disposed between the substrates 100 and 200, and the nonpolar liquid layer 10a is disposed between the polar liquid layer 20 and the substrate 100. The nonpolar liquid layer 10a can be silicon oil, decane, dodecane, tetradecane, or a mixture of tetradecane and dodecane. The polar liquid layer 20 can be water, sodium chloride aqueous solution, or potassium chloride aqueous solution. In a preferred embodiment, the nonpolar liquid layer 10a is preferably between 1 and 10 μm thick, and the polar liquid layer 20 is preferably between 10 and 100 μm thick. In other embodiments, the nonpolar liquid layer 10a and the polar liquid layer 20 may have other appropriate thicknesses. Further, the nonpolar liquid layer 10a may comprise dyes or pigments.

In the embodiment shown in FIG. 1B referring to FIG. 1A, a hydrophobic layer 130 is disposed overlying the opposing surface 100a of the substrate 100. In other words, the hydrophobic layer 130 is disposed between the substrate 100 and the nonpolar liquid layer 10a, and the nonpolar liquid layer 10a is disposed overlying the hydrophobic layer 130. The polar liquid layer 20 is disposed overlying the nonpolar liquid layer 10a. In one embodiment, the hydrophobic layer 130 is hydrophobic polymers comprising fluorine, and can be between 0.1 and 1 μm thick.

A hydrophilic separator 140 is disposed overlying the hydrophobic layer 130, and surrounds the nonpolar liquid layer 10a. The range of a pixel area 40 is determined by the disposition of the hydrophilic separator 140. In one embodiment, the hydrophilic separator 140 is selected from a group consisting of a positive photoresist, a negative photoresist, a photo-curing resin, and a thermosetting resin. In another preferred embodiment of the invention, the hydrophilic separator 140 has light extinction property to increase image contrast presented by the display. In this embodiment, the hydrophilic separator 140 is preferably between 5 and 50 μm thick, and can have other appropriate thickness as required in other embodiments. A protruding spacer 240a is disposed between the hydrophilic separator 140 and the substrate 200 to stabilize the gap between the substrates 100 and 200 in the pixel area 40. Further, if the substrates 100 and 200 are flexible substrates, the protruding spacer 240a also can prevent overflow of the nonpolar liquid layer 10a to the neighboring pixel areas when the inventive display is flexed. In one embodiment, the protruding spacer 240a is selected from a group consisting of a positive photoresist, a negative photoresist, a photo-curing resin, and a thermosetting resin. In another preferred embodiment of the invention, the protruding spacer 240a has light extinction property to increasing image contrast presented by the display. In this embodiment, the protruding spacer 240a is preferably between 5 and 50 μm thick, and can have other appropriate thickness as required in other embodiments.

An electrode layer 210 is disposed between the polar liquid layer 20 and the substrate 200, and an electrode layer 110 is disposed between the hydrophobic layer 130 and the substrate 100 to apply electric voltage to the nonpolar liquid layer 10a and/or the polar liquid layer 20. The electrode layers 110 and 210 are preferably between 0.1 and 1 μm thick. The electrode layers 110 and 210 can have the same or different thicknesses. In one embodiment, the electrode layers 110 and 210 are metals or electrically conductive oxides. In other embodiments, at least one of the electrode layers 110 and 210 is a transparent electrode. In this embodiment, the electrode layer 110 is a patterned conductive layer corresponding to the pixel area 40, and the pattern thereof can be a triangular, a square, a rectangular, a circular, or an oval. In another embodiment, at least one of the electrode layers 110 and 210 is a continuous conductive layer. In yet another embodiment, the electrode layer 210, similar to the electrode layer 110, may be a patterned conductive layer corresponding to the pixel area 40, and the electrode layers 110 and 210 can have the same or different patterns.

Further, a dielectric layer 120 can be disposed overlying the electrode layer 110, and can be silicon dioxide, silicon nitride, tantalum oxide, lead zirconate titanate (PZT), barium strontium titanate ((Ba, Sr)TiO$_3$; BST), barium titanate (BaTiO$_3$; BTO), or polyvinylidene difluoride (PVDF). When applying electric voltage to the electrode layer 110, electric charge distribution is formed in a surface of the dielectric layer 120, and the electric charge distribution allows the polar liquid layer 20 to have an attraction to the surface of the dielectric layer 120, driving the nonpolar liquid layer 10a to a corner of the pixel area 40. In one embodiment, it is not necessary for the dielectric layer 120 to be hydrophobic because the hydrophobic layer 130 is disposed. In another embodiment, the dielectric layer 120 is also hydrophobic. In yet another embodiment, the hydrophobic layer 130 is disposed, but the dielectric layer 120 is not disposed, and thus, the hydrophobic layer 130 concurrently has functions of the dielectric layer 120. In some embodiments, the electrode layer 110 and the dielectric layer 120 can be considered as parts of the substrate 100.

In a preferred embodiment of the invention shown in FIG. 1C, an adhesive layer 250 is disposed between the hydrophilic separator 140 and the protruding spacer 240*a* of the embodiment shown in FIG. 1B to increase the adhesion therebetween to improve the reliability of the display. In this embodiment, a raw material of the adhesive layer 250 can be selected from a group consisting of a photo-curing gel, a thermosetting gel, and a water-curing gel, and preliminarily formed on a predetermined adhesion surface of the protruding spacer 240*a* (with the hydrophilic separator 140). After connecting the hydrophilic separator 140 and the protruding spacer 240*a*, the raw material is hardened by photo-curing, thermal curing, or injection of polar liquid layer 20 containing water depending on the selected type, to become the adhesive layer 250. In another embodiment, the raw material of the adhesive layer 250 is preliminarily formed on a predetermined adhesion surface of the hydrophilic separator 140 (with the protruding spacer 240*a*), followed by the connecting and hardening steps as described previously, to become the adhesive layer 250.

In the embodiment shown in FIG. 1D, a dielectric layer 220 is disposed overlying the electrode 210 of the embodiment shown in FIG. 1B. In this embodiment, the dielectric layer 220 is hydrophilic.

Figure 2A:
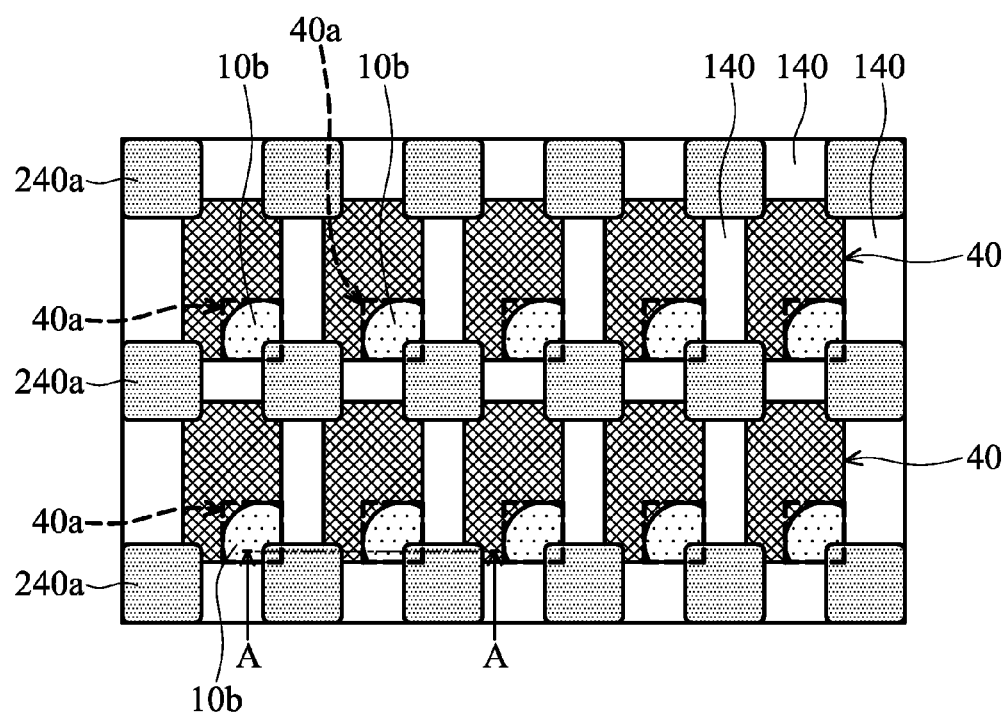
FIG. 2A shows a top view of the display shown in FIG. 1A when applying electric voltage to liquid layers.
Figure 2B:
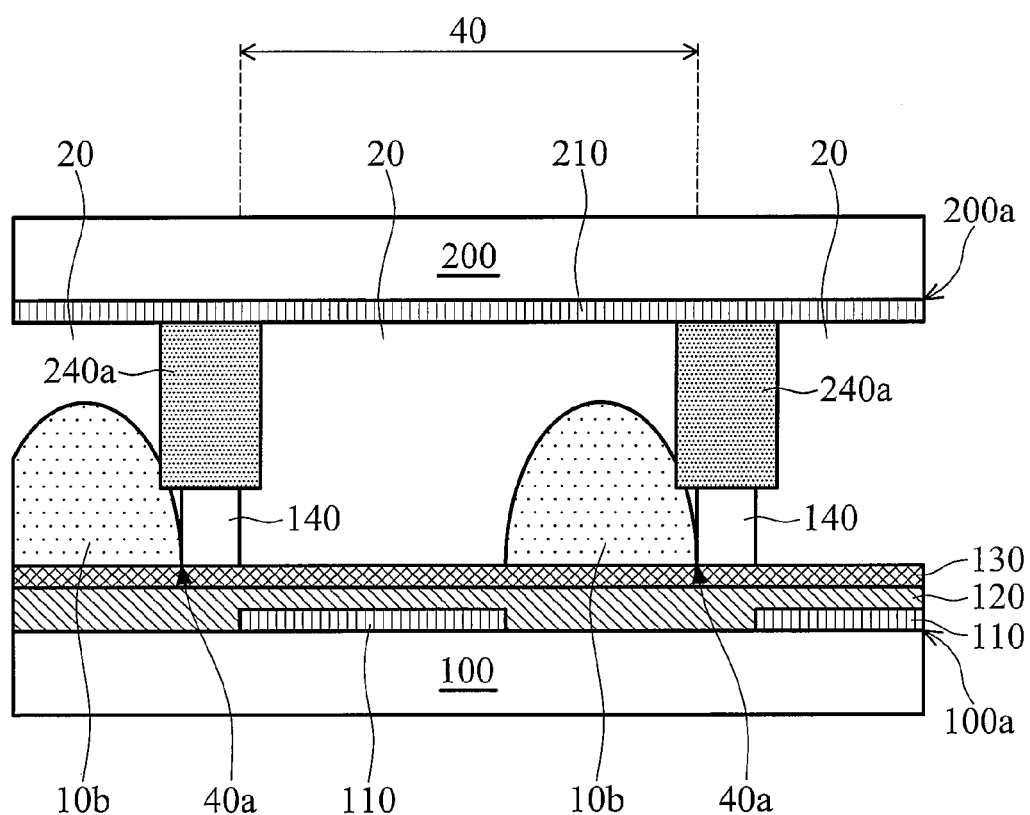
FIG. 2B shows a cross-section along line AA in FIG. 2A.

Next, referring to FIGS. 2A and 2B, which are respectively a top view and a cross-section showing displays of one or more preferred embodiments of the invention when applying electric voltage to liquid layers. FIG. 2B is a cross-section along line AA in FIG. 2A. FIG. 2A is a top view, showing relative top views from an outer side of the substrate 200 to the substrate 100. The substrate 200 and the electrode layer 210 thereon, shown in FIG. 2B are not shown in FIG. 2A for clarity and simplicity. The situations when applying electric voltage to liquid layers previously described for the displays of the embodiments shown in FIG. 1C and 1D that are the same as or similar to that shown in FIG. 2B are omitted herefrom.

In FIGS. 2A and 2B, electric power is applied to the non-polar liquid layer 10*a* (shown in FIGS. 1A and 1B) and the polar liquid layer 20 by connection of the electrode layers 110 and 210 to an electric voltage supply (not shown), for example, or other methods to change the interface tensions between the polar liquid layer 20 and the hydrophobic layer 130. As a result, the nonpolar liquid layer 10*a* agglomerates to a corner of the hydrophilic separator 140, namely a corner 40*a* of the pixel area 40, to become a nonpolar drop 10*b*. Further, the electrode layer 110 comprises a void corresponding to the corner 40*a*. That is, the electrode layer 110 is not distributed in the predetermined corner 40*a*, and the electric field substantially is not distributed to the corner 40*a*, thereby limiting the nonpolar drop 10*b* in the corner 40*a*. At this time, if the protruding spacer 240*a* is disposed overlying the part of the hydrophilic separator 140 corresponding to the corner 40*a*, overflow of the nonpolar drop 10*b* to the neighboring pixel areas or other regions can be prevented. Further, when considering that the color of the nonpolar drop 10*b* after agglomeration may be darker, the image contrast presented by the display of a preferred embodiment of the invention can be further improved when the disposed hydrophilic separator 140 and/or protruding spacer 240*a* are light extinction materials.

Other modifications of the display of the embodiment shown in FIG. 2B to further improve the presented image contrast are shown in FIGS. 3A through 3F. The modification can also be applied to the displays of embodiments shown in FIGS. 1C and 1D to improve the presented image contrast.

Figure 3A:
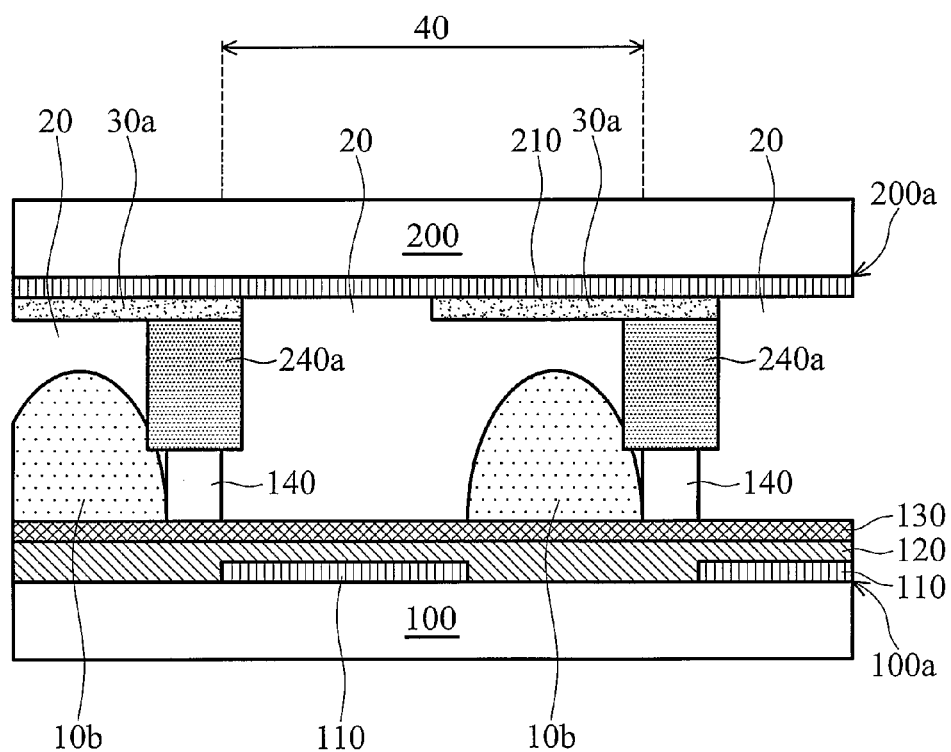
FIGS. 3A through 3F show cross-sections of modifications of the displays shown in FIGS. 1B through 1D and 2A.
Figure 3B:
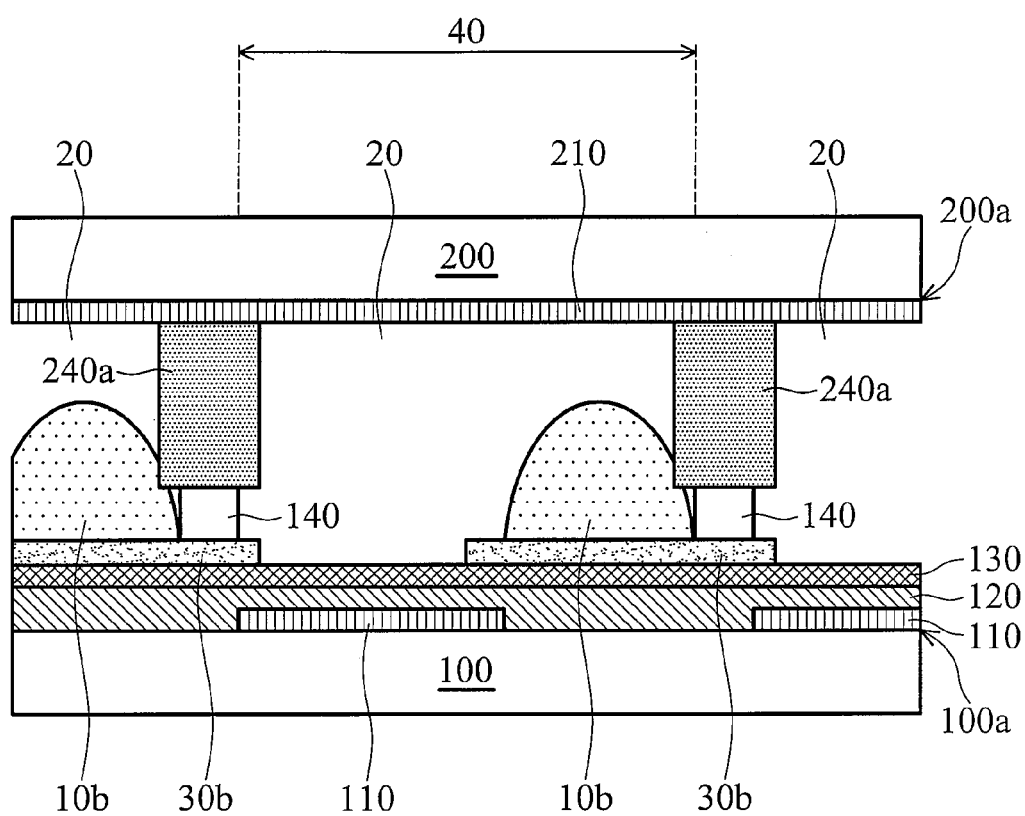
Figure 3C:
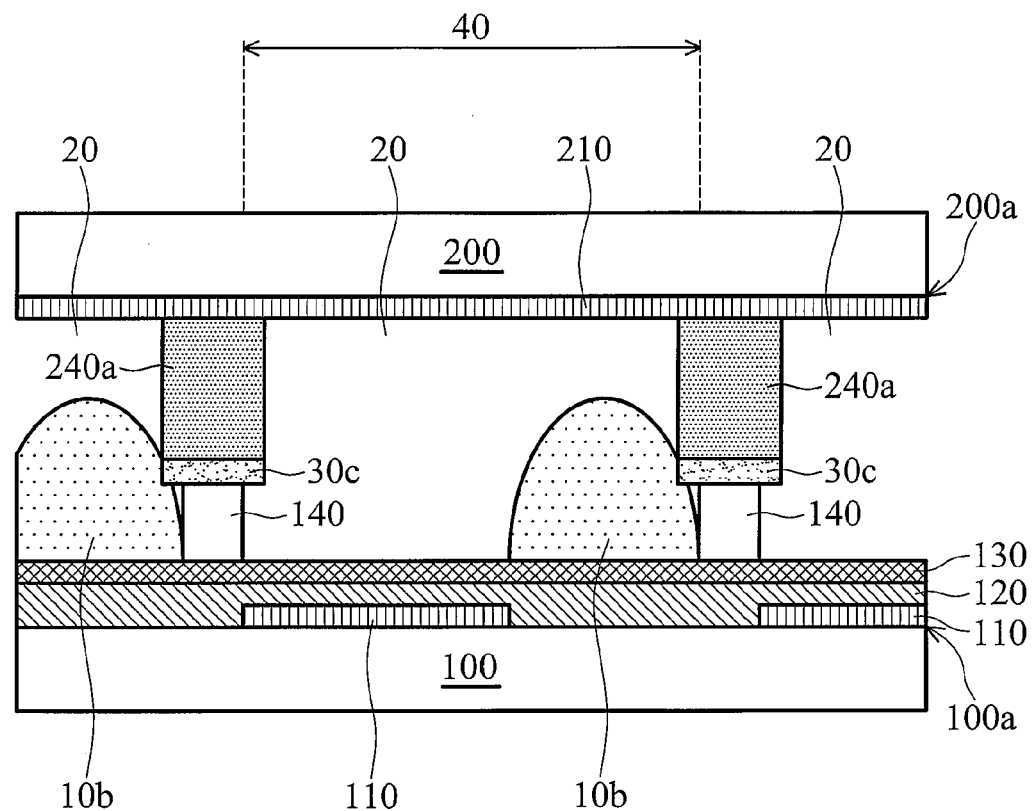

In one embodiment as shown in FIG. 3A, a light extinction layer 30*a* is disposed between the substrate 200 and the protruding spacer 240*a*. The extension of the light extinction layer 30*a* is enough to cover the nonpolar drop 10*b* when applying electric voltage thereto. In another embodiment as shown in FIG. 3B, a light extinction layer 30*b* is disposed between the hydrophobic layer 130 and a combination consisting of the hydrophilic separator 140 and the nonpolar drop 10*b*. The extension of the light extinction layer 30*b* is enough to completely support the nonpolar drop 10*b* when applying electric voltage thereto. In yet another embodiment as shown in FIG. 3C, a light extinction layer 30*c* is disposed between the hydrophilic separator 140 and the protruding spacer 240*a*.

Figure 3D:
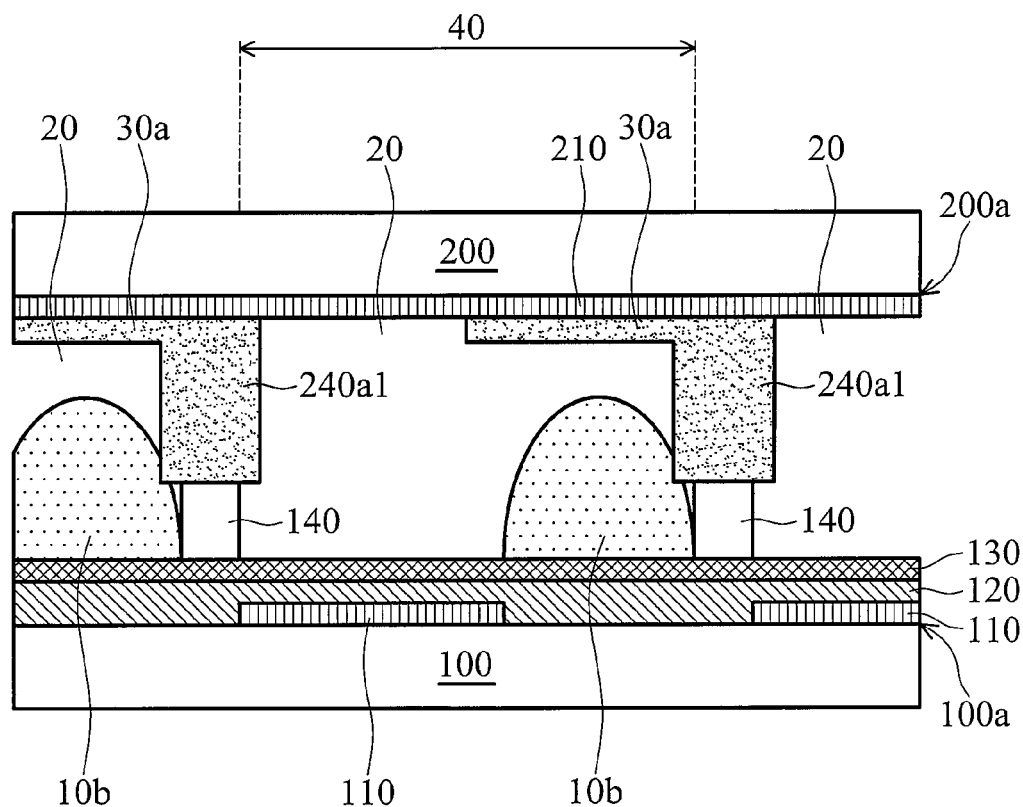
Figure 3E:
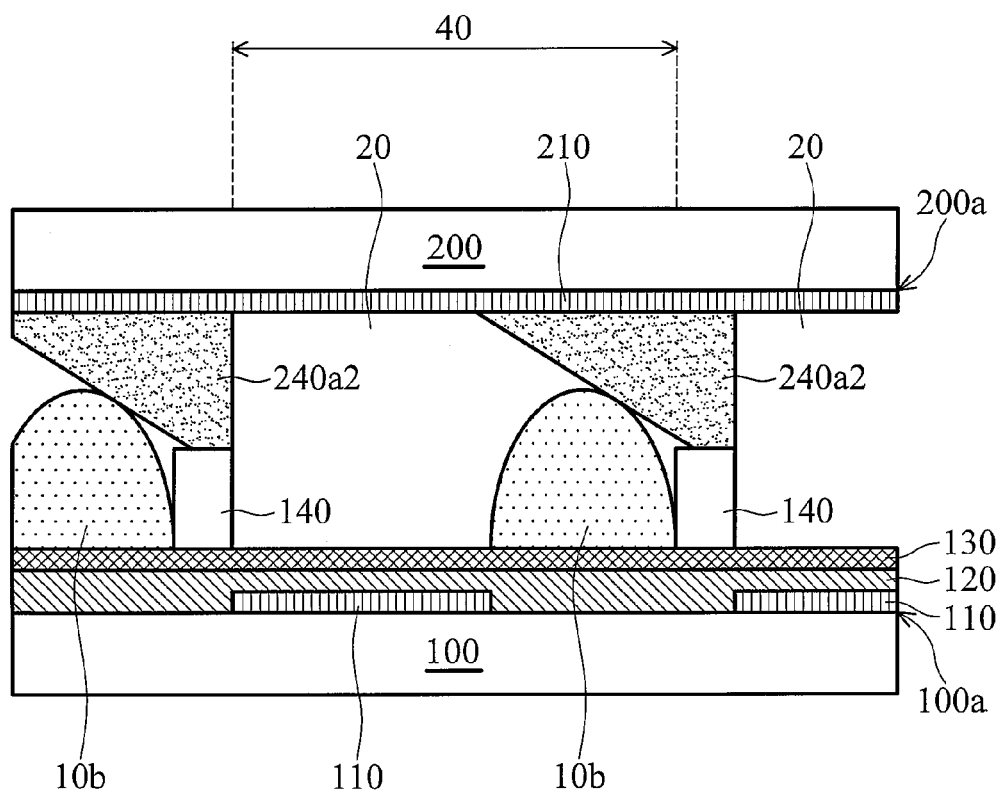

In yet another embodiment as shown in FIG. 3D, the protruding spacer 240*a* shown in FIG. 3A is replaced by a protruding spacer 240*a*1 of the same material as that of the light extinction layer 30*a*. In yet another embodiment as shown in FIG. 3E, the protruding spacer 240*a* and the light extinction layer 30*a* shown in FIG. 3A are replaced by a trapezoid protruding spacer 240*a*2 of the same material as that of the light extinction layer 30*a*. The extension of the trapezoid protruding spacer 240*a*2 is enough to cover the nonpolar drop 10*b* when applying electric voltage thereto. The trapezoid protruding spacer 240*a*2 of FIG. 3E means it is trapezoid in a vertical section from the substrate 200 to the substrate 100.

Figure 3F:
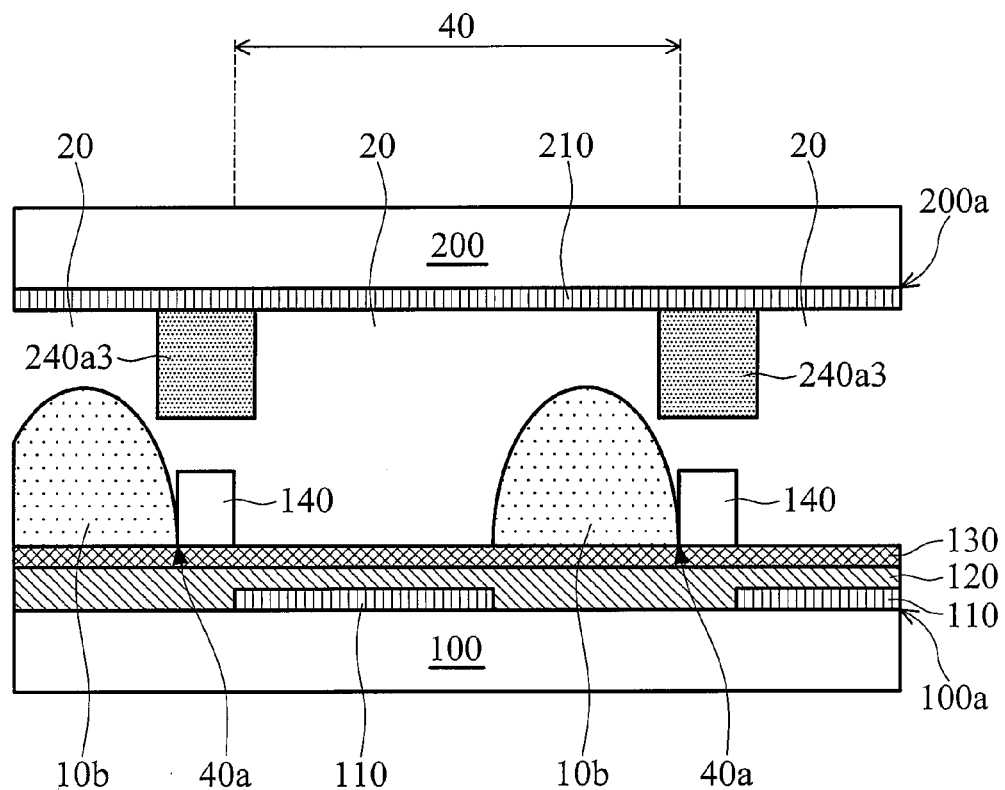

In yet another embodiment as shown in FIG. 3F, the protruding spacer 240*a* shown in FIG. 3A is replaced by a protruding spacer 240*a*3 not contacting the hydrophilic separator 140. In this embodiment, the gap between the hydrophilic separator 140 and the protruding spacer 240*a*3 can be properly determined, and the protruding spacer 240*a*3 can still prevent overflow of the nonpolar drop 10*b* to the neighboring pixel areas or other regions, and prevent the nonpolar drop 10*b* from touching the substrate 200 when the substrates 100 and 200 are pressed or flexed. Those skilled in the art can determine the gap between the hydrophilic separator 140 and the protruding spacer 240*a*3 according to the viscosity of the nonpolar drop 10*b*, the surface tension between the nonpolar drop 10*b* and the hydrophilic separator 140 and the protruding spacer 240*a*3, and etc. in unlimited experimental steps.

In FIGS. 1A and 2A, the protruding spacer 240*a* is a square prism. In practice, the four corners of the protruding spacer 240*a* are typically rounded as shown in FIGS. 1A and 2A to prevent stress concentration or other problems. Further, the protruding spacer 240*a* shown in FIGS. 1A and 2A can be replaced by other protruding spacers of different shapes as shown in FIGS. 4A through 4E.

Figure 4A:
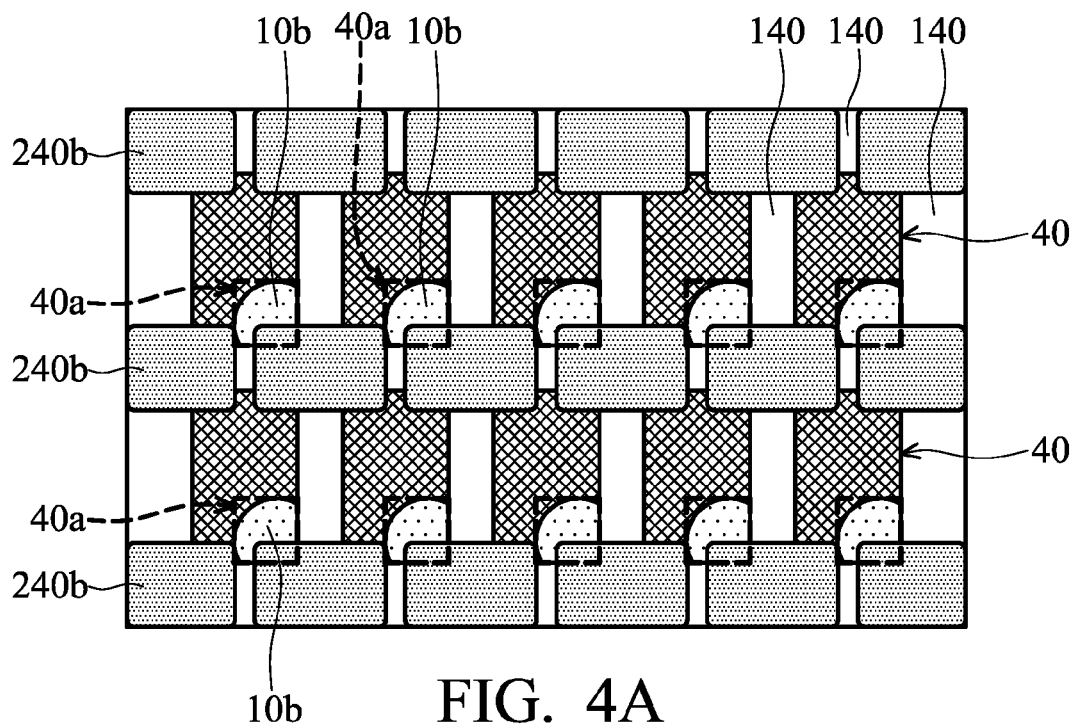
FIGS. 4A through 4F show cross-sections of other modifications of the displays shown in FIGS. 1A and 2A.
Figure 4B:
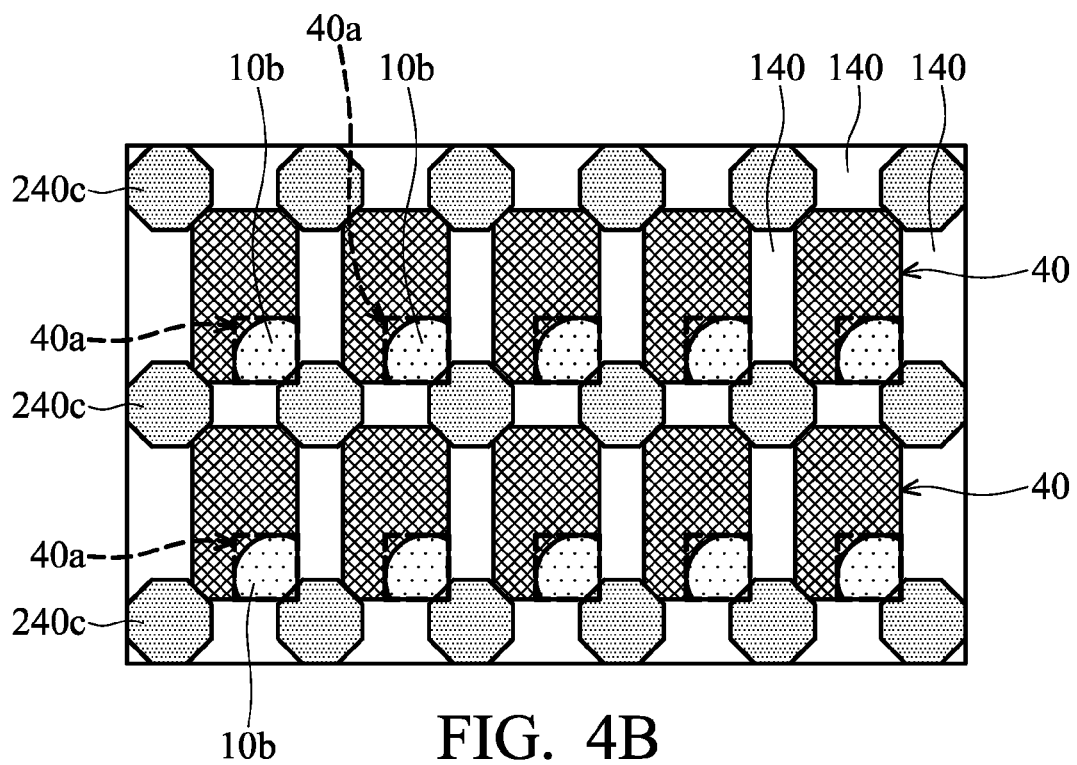
Figure 4C:
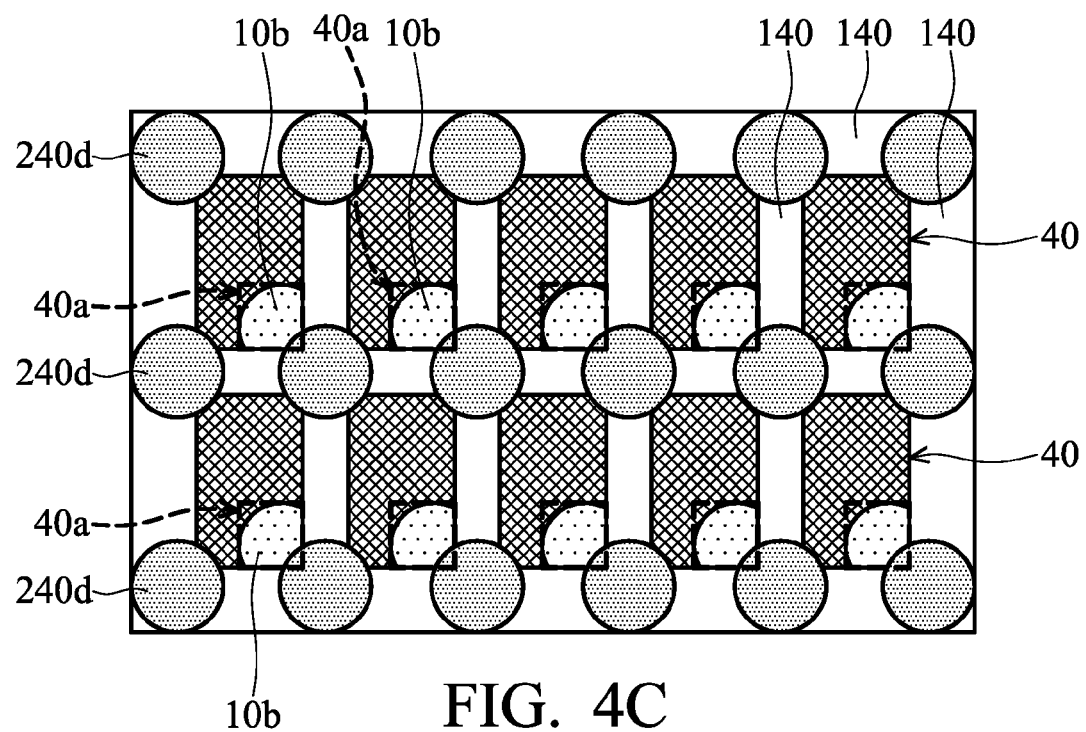
Figure 4D:
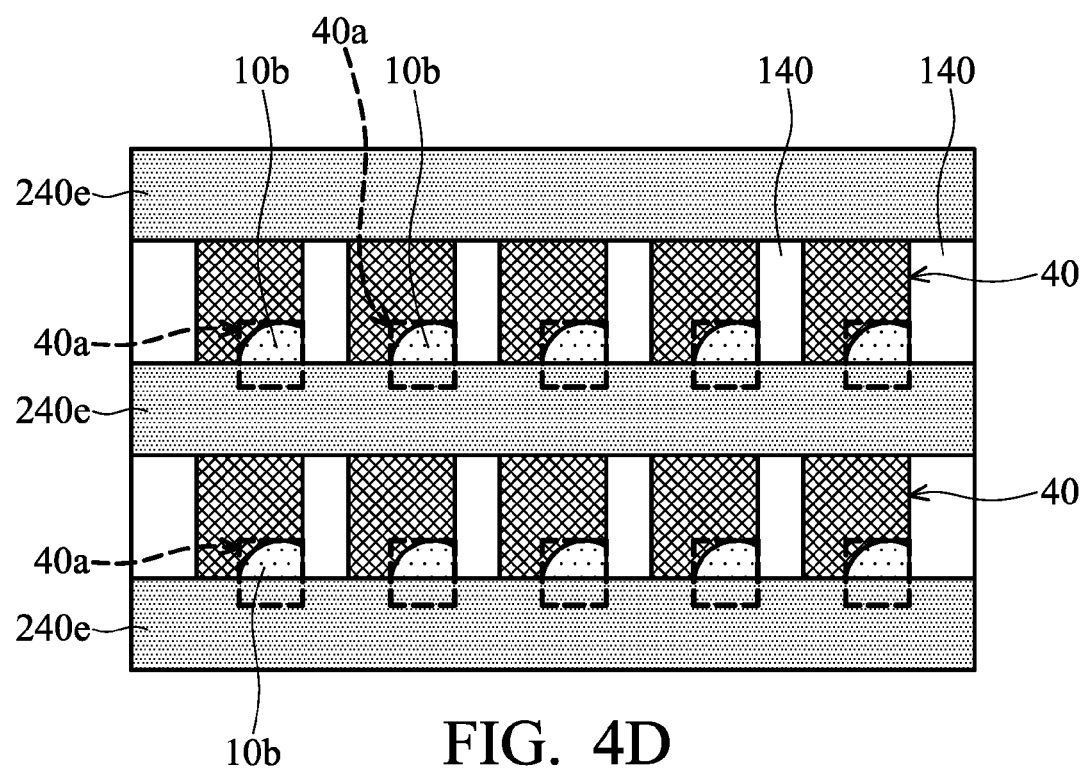
Figure 4E:
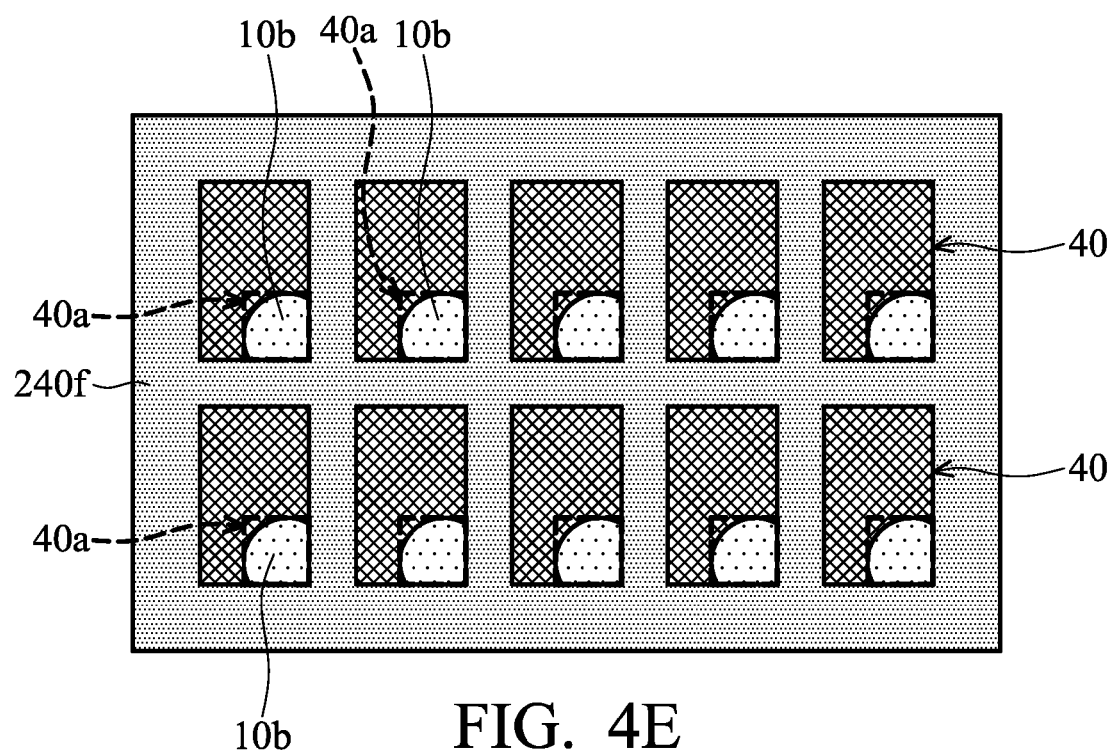
Figure 4F:
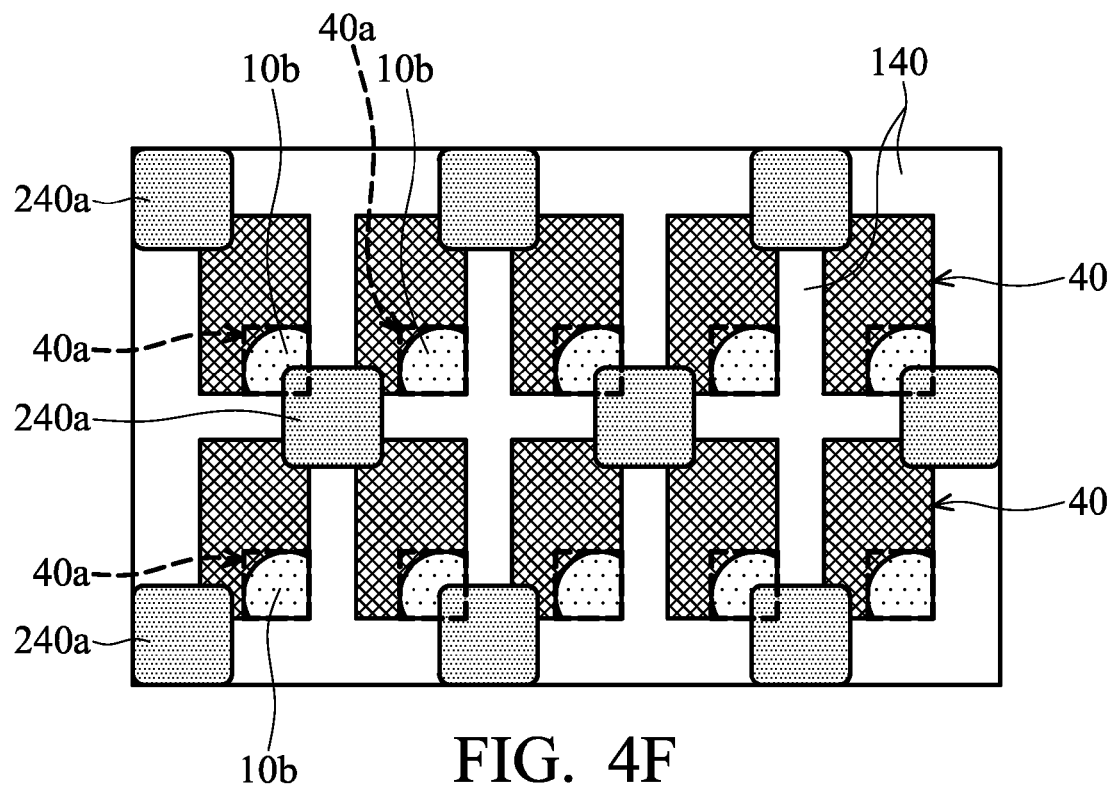

In one embodiment as shown in FIG. 4A, the protruding spacer 240*a* shown in FIGS. 1A and 1B is replaced by a protruding spacer 240*b* which is a rectangular prism. Similarly, in practice, the four corners of the protruding spacer 240*b* are typically rounded as shown in FIG. 4A to prevent stress concentration or other problems. In another embodiment as shown in FIG. 4B, the protruding spacer 240*a* shown in FIGS. 1A and 1B is replaced by a protruding spacer 240*c* which is a polygon prism. In yet another embodiment as shown in FIG. 4C, the protruding spacer 240*a* shown in FIGS. 1A and 1B is replaced by a protruding spacer 240*d* which is a column. In yet another embodiment as shown in FIG. 4D, the protruding spacer 240*a* shown in FIGS. 1A and 1B is replaced by a protruding spacer 240*e* which is a strip. The strip extension of the protruding spacer 240*e* shown in FIG. 4D is along the X direction in the figure, but those skilled in the art can modify the strip extension of the protruding spacer 240*e* shown in FIG. 4D to be along the y direction of the figure. In yet another embodiment as shown in FIG. 4E, the protruding spacer 240*a* shown in FIGS. 1A and 1B is replaced by a protruding spacer 240*f* which is a mesh grid. The pattern of the protruding spacer 240*f* shown in FIG. 4E is the same as that of the underlying hydrophilic separator 140, but can be modified or varied to other types of mesh grids by those skilled in the art as required. In addition to shapes, the materials, processing methods, and other properties of the protruding spacers 240b through 240f are the same as those of the protruding spacer 240a shown in FIGS. 1A and 2A, and thus, are omitted herefrom. In yet another embodiment as shown in FIG. 4F, it is not necessary to form the protruding spacer 240a shown in FIGS. 1A and 1B in each pixel area 40. The protruding spacer 240a shown in FIGS. 1A and 1B can be selectively formed in particular pixel areas where overflow of the nonpolar drop 10b would most probably occur, or alternatively, be formed in a way that there are one or more protruding spacer free pixel areas between two neighboring protruding spacers 240a.

In an exemplary fabrication method of the displays of one or more embodiments of the invention shown in FIGS. 1A and 1B through 1D, the substrates 100 and 200 are firstly provided. The substrates 100 and 200 respectively comprise opposing surfaces 100a and 200a. The substrates 100 and 200 can be simultaneously, respectively, or sequentially processed before being oppositely disposed. If the substrates 100 and 200 are sequentially processed, those skilled in the art can determine the particular processing sequence as required. For descriptive writing purposes, it is easier to describe the processes for the substrates 100 and 200 sequentially. The processes of the substrates 100 and 200, however, are not limited to the subsequent sequence. Those skilled in the art can determine the processing flow of the substrates 100 and 200 according to described types.

First, fabrication process of the substrate 100 is described.

The hydrophobic layer 130 is formed overlying the opposing surface 100a of the substrate 100 by a method such as chemical vapor deposition (CVD), spin coating, or other known film forming methods. The electrode layer 110 and the dielectric layer 120 are formed overlying the substrate 100 prior to the formation of the hydrophobic layer 130. In this embodiment, the electrode layer 110 and the dielectric layer 120 are seen as parts of the substrate 100.

Next, a plurality of staggered hydrophilic separators 140 are formed overlying the hydrophobic layer 130 by a method such as lithography, molding, reverse printing, or stencil printing, and the hydrophilic separators 140 surround the predetermined pixel area 40. When processed by lithography, a material layer of the hydrophilic separators 140 is completely formed overlying the hydrophobic layer 130, followed by formation of a resist layer (not shown) thereon. After conventional exposing and developing steps, the resist layer becomes an etch mask. The material layer not covered by the etch mask is removed by a method such as etching, and then the etch mask is removed, thereby forming the hydrophilic separators 140. When processed by molding, the substrate 100 is disposed in a previously fabricated mold, selectively forming the hydrophilic separators 140 as described above, overlying predetermined positions of the hydrophobic layer 130 by a technology such as injection molding. When processed by stencil printing, a through hole pattern according to the required pattern of the hydrophilic separators 140 is formed in a rigid or flexible stencil, followed by alignment between the through hole pattern and the hydrophobic layer 130, and disposition of a fluid material of the hydrophilic separators 140 on the stencil. The fluid material of the hydrophilic separators 140 flows to corresponding positions on the hydrophobic layer 130 via the through hole pattern utilizing a squeeze sweeping the fluid material of the hydrophilic separators 140 across the through hole pattern. The fluid material of the hydrophilic separators 140 is then hardened and fixed overlying the hydrophobic layer 130, becoming the required hydrophilic separators 140, and the stencil is removed. Further, the sequence of the steps of hardening the hydrophilic separators 140 and removing the stencil can be adjusted depending on the properties of the fluid material and/or requirement.

Next, the nonpolar liquid layer 10a is disposed overlying the hydrophobic layer 130 in the pixel area 40 by a method such as dip-coating, ink jet, or other appropriate technologies, and surrounded by the hydrophilic separators 140.

Then, the polar liquid layer 20 is disposed overlying the nonpolar liquid layer 10a by a method such as dip-coating, ink jet, or other appropriate technologies.

After the described steps, the required processes of the substrate 100 before oppositely disposing the substrates 100 and 200 are complete.

Next, fabrication process of the substrate 200 is described.

The protruding spacer 240a is formed overlying the opposing surface 200a of the substrate 200, corresponding to a predetermined region of the hydrophilic separators 140, such as the corresponding region to the corner 40a shown in FIG. 2B, namely the intersection region of the hydrophilic separators 140. The protruding spacer 240a can be formed by a method such as lithography, molding, reverse printing, or stencil printing, whereby detailed descriptions are similar to the description for the hydrophilic separator 140, and thus, are omitted herefrom. The electrode layer 210 is formed overlying the substrate 200 prior to the formation of the protruding spacer 240a. In this embodiment, the electrode layer 210 is seen as a part of the substrate 200.

After the previously described steps, the required processes of the substrate 200 before oppositely disposing the substrates 100 and 200 are complete. Then, the protruding spacer 240a and the predetermined region of the hydrophilic separators 140 are aligned, fixing the protruding spacer 240a on the hydrophilic separators 140, and oppositely disposing the substrates 100 and 200. After a raw material of an adhesive is formed on a predetermined adhesion surface of the protruding spacer 240a (with the hydrophilic separator 140) or a predetermined adhesion surface of the hydrophilic separator 140 (with the protruding spacer 240a) and a described curing step is performed before fixing the protruding spacer 240a on the hydrophilic separator 140, the display shown in FIG. 1C is formed. If the electrode layer 210 and the dielectric layer 220 shown in FIG. 1D are formed overlying the substrate 200 before fixing the protruding spacer 240a on the hydrophilic separator 140, the display shown in FIG. 1D is formed. Further, if the protruding spacer 240a shown in FIG. 2B is replaced by the protruding spacer 240a3 shown in FIG. 3F, the protruding spacer 240a3 is fixed above the hydrophilic separator 140, and there is a gap therebetween during the disposition of the opposing substrates 100 and 200.

Figure 5A:
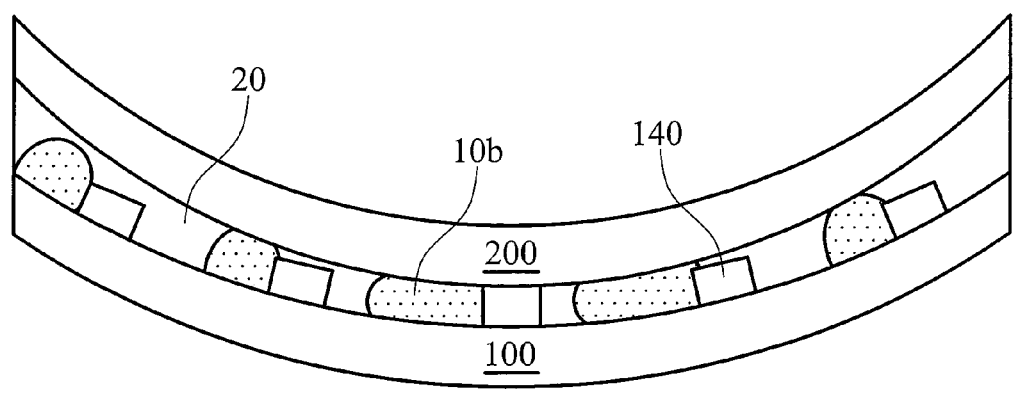
FIGS. 5A and 5B show cross-sections of one of the important effects of the display of one or more preferred embodiments of the invention.
Figure 5B:
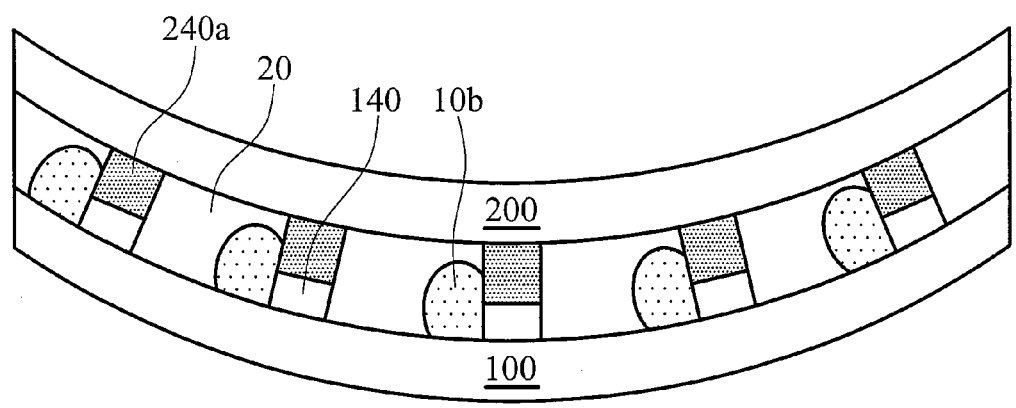

Next, one of the important effects of the display of one or more preferred embodiments of the invention is described in FIGS. 5A and 5B. The substrates 100 and 200 shown in FIGS. 5A and 5B are flexible substrates. The display shown in FIG. 5A is a comparison example, wherein there is no protruding spacers or those similar to or compatible with the protruding spacers 240a through 240f in FIGS. 2A and 4A through 4E disposed between the hydrophilic separator 140 and the substrate 200. The display shown in FIG. 5B is the same as those shown in FIGS. 2A and 2B, but the electrode layers 110 and 210, the dielectric layers 120 and 220, and the hydrophobic layer 130 hydrophobic layer 130 are not shown.

In FIG. 5A, assuming that the substrates 100 and 200 are both flexible substrates, parts of the nonpolar drops 10b cannot operate smoothly due to varied gaps between the substrates 100 and 200. For example, the nonpolar drop 10b cannot completely agglomerate backward, or the nonpolar drop 10*b* overflows to the neighboring pixel areas. Thus, resulting in problems such as failed component parts of the display, causing uneven image color, and bad contrast.

In FIG. 5B, assuming that the substrates 100 and 200 are both flexible substrates, the gap between the substrates 100 and 200 is fixed by the structure comprising the protruding spacer 240*a* and the hydrophilic separator 140, preventing problems such as failed components parts of the display.

While the invention has been described by way of example and in terms of preferred embodiment, it is to be understood that the invention is not limited thereto. To the contrary, it is intended to cover various modifications and similar arrangements (as would be apparent to those skilled in the Art). Therefore, the scope of the appended claims should be accorded the broadest interpretation so as to encompass all such modifications and similar arrangements.

What is claimed is:

1. A display, comprising:
   a first substrate and a second substrate each comprising an opposing surface, wherein the first substrate and the second substrate are disposed in a way that the opposing surfaces are face-to-face opposing to each other;
   a hydrophobic layer overlying the opposing surface of the second substrate;
   a nonpolar liquid layer overlying the hydrophobic layer;
   a hydrophilic separator overlying the hydrophobic layer and surrounding the nonpolar liquid layer;
   a polar liquid layer overlying the nonpolar liquid layer;
   a protruding spacer disposed between the hydrophilic separator and the first substrate;
   a first electrode layer disposed between the polar liquid layer and the first substrate; and
   a second electrode layer disposed between the hydrophobic layer and the second substrate.

2. The display as claimed in claim 1, further comprising a dielectric layer disposed between the hydrophobic layer and the first electrode layer.

3. The display as claimed in claim 1, wherein
   the nonpolar liquid layer agglomerates to a corner of the hydrophilic separator, becoming a nonpolar drop when applying electricity voltage thereto; and
   the protruding spacer is disposed on the hydrophilic separator at the corner.

4. The display as claimed in claim 3, further comprising a light extinction layer disposed between the first substrate and the protruding spacer, and covering the nonpolar drop.

5. The display as claimed in claim 4, wherein the protruding spacer is trapezoid in a vertical section from the first substrate to the second substrate, and an extension of the protruding spacer covers the nonpolar drop.

6. The display as claimed in claim 3, further comprising a light extinction layer disposed between the second substrate and a combination consisting of the hydrophilic separator and the nonpolar drop, wherein the nonpolar drop agglomerates to be directly above an extension of the light extinction layer when applying electricity voltage thereto.

7. The display as claimed in claim 1, further comprising a light extinction layer disposed between the hydrophilic separator and the protruding spacer.

8. The display as claimed in claim 1, wherein
   the hydrophilic separator has a light extinction property; or
   the protruding spacer has a light extinction property.

9. The display as claimed in claim 1, further comprising an adhesive layer disposed between the hydrophilic separator and the protruding spacer.

10. The display as claimed in claim 1, wherein the protruding spacer is hydrophilic, and selected from a group consisting of a positive photoresist, a negative photoresist, a photo-curing resin, and a thermosetting resin.

11. The display as claimed in claim 1, wherein a shape of the protruding spacer is selected from a group consisting of a square prism, a rectangular prism, a polygon prism, a column, a mesh grid, and a strip.

12. The display as claimed in claim 1, wherein the protruding spacer does not contact the hydrophilic separator.

13. A display, comprising:
   a first flexible substrate and a second flexible substrate disposed oppositely to each other, a polar liquid layer and a nonpolar liquid layer disposed therebetween, wherein the nonpolar liquid layer is disposed between the polar liquid layer and the second flexible substrate;
   a hydrophobic layer disposed between the polar liquid layer and the second flexible substrate;
   a hydrophilic separator overlying the hydrophobic layer and surrounding the nonpolar liquid layer;
   a protruding spacer disposed between the hydrophilic separator and the first flexible substrate;
   a first electrode layer disposed between the polar liquid layer and the first flexible substrate; and
   a second electrode layer disposed between the hydrophobic layer and the second flexible substrate.

14. The display as claimed in claim 13, further comprising a dielectric layer disposed between the hydrophobic layer and the first electrode layer.

15. The display as claimed in claim 13, wherein
   the nonpolar liquid layer agglomerates to a corner of the hydrophilic separator, becoming
   a nonpolar drop when applying electricity voltage thereto; and
   the protruding spacer is disposed on the hydrophilic separator at the corner.

16. The display as claimed in claim 15, further comprising a light extinction layer disposed between the first flexible substrate and the protruding spacer, and covering the nonpolar drop.

17. The display as claimed in claim 15, further comprising a light extinction layer disposed between the second flexible substrate and a combination consisting of the hydrophilic separator and the nonpolar drop, and the nonpolar drop agglomerates to be directly above an extension of the light extinction layer when applying electricity voltage thereto.

18. The display as claimed in claim 15, wherein the protruding spacer is trapezoid in a vertical section from the first flexible substrate to the second flexible substrate, and an extension of the protruding spacer covers the nonpolar drop.

19. The display as claimed in claim 13, further comprising a light extinction layer disposed between the hydrophilic separator and the protruding spacer.

20. The display as claimed in claim 13, wherein
   the hydrophilic separator has a light extinction property; or
   the protruding spacer has a light extinction property.

21. The display as claimed in claim 13, further comprising an adhesive layer disposed between the hydrophilic separator and the protruding spacer.

22. The display as claimed in claim 13, wherein the protruding spacer is hydrophilic, and selected from a group consisting of a positive photoresist, a negative photoresist, a photo-curing resin, and a thermosetting resin.

23. The display as claimed in claim 13, wherein a shape of the protruding spacer is selected from a group consisting of a square prism, a rectangular prism, a polygon prism, a column, a mesh grid, and a strip.

24. The display as claimed in claim 13, wherein the protruding spacer does not contact the hydrophilic separator.

25. A fabrication method of a display, comprising:
providing a first substrate and a second substrate each comprising an opposing surface;
forming a hydrophobic layer overlying the opposing surface of the second substrate;
forming a hydrophilic separator overlying the hydrophobic layer and surrounding a predetermined pixel region;
forming a protruding spacer overlying the opposing surface of the first substrate and corresponding to a predetermined area of the hydrophilic separator;
disposing a nonpolar liquid layer overlying the hydrophobic layer in the pixel region, wherein the nonpolar liquid layer is surrounded by the hydrophilic separator;
disposing a polar liquid layer overlying the nonpolar liquid layer; and
aligning the protruding spacer and the predetermined area of the hydrophilic separator, fixing the protruding spacer above the hydrophilic separator, and disposing the first substrate and the second substrate in a way that the opposing surfaces are face-to-face opposing to each other.

26. The method as claimed in claim 25, wherein the hydrophilic separator is formed by lithography, molding, reverse printing, or stencil printing.

27. The method as claimed in claim 25, wherein the protruding spacer is formed by lithography, molding, reverse printing, or stencil printing.

28. The method as claimed in claim 25, wherein the protruding spacer is hydrophilic, and selected from a group consisting of a positive photoresist, a negative photoresist, a photocuring resin, and a thermosetting resin.

29. The method as claimed in claim 25, wherein the protruding spacer does not contact the hydrophilic separator during disposition of the first substrate and the second substrate.

* * * * *